(12) United States Patent
Servidone

(10) Patent No.: US 8,344,681 B2
(45) Date of Patent: Jan. 1, 2013

(54) APPARATUS AND METHOD FOR MINIMIZING UNDESIRABLE STEPPER MOTOR ROTOR MOTIONS

(76) Inventor: Francesco Servidone, Newington, CT (US)

( * ) Notice: Subject to any disclaimer, the term of this patent is extended or adjusted under 35 U.S.C. 154(b) by 1044 days.

(21) Appl. No.: 12/240,224

(22) Filed: Sep. 29, 2008

(65) Prior Publication Data

US 2010/0079102 A1    Apr. 1, 2010

(51) Int. Cl.
*H02P 8/08* (2006.01)
(52) U.S. Cl. .......................... 318/685; 318/696
(58) Field of Classification Search .............. 318/685, 318/686, 700, 701, 714, 720, 721, 722; 116/46, 116/47, 284–288, 297; 324/154 R, 154 PB
See application file for complete search history.

(56) References Cited

U.S. PATENT DOCUMENTS

| | | | |
|---|---|---|---|
| 3,586,953 A | | 6/1971 | Markkanen et al. |
| 4,074,179 A | * | 2/1978 | Kuo et al. ................ 318/696 |
| 4,851,755 A | | 7/1989 | Fincher |
| 5,189,355 A | | 2/1993 | Larkins et al. |
| 5,929,589 A | * | 7/1999 | Suzuki et al. ............... 318/685 |
| 5,990,651 A | * | 11/1999 | Iwazawa et al. ............ 318/685 |
| 6,013,999 A | * | 1/2000 | Howard et al. ............. 318/685 |
| 6,271,641 B1 | * | 8/2001 | Yasohara et al. ........... 318/685 |
| 6,586,898 B2 | * | 7/2003 | King et al. ............. 318/400.34 |
| 6,667,595 B2 | * | 12/2003 | Wiseman ................... 318/696 |
| 6,850,026 B2 | * | 2/2005 | Takemori et al. .......... 318/685 |
| 6,853,162 B2 | * | 2/2005 | Betts et al. ................. 318/696 |
| 7,026,773 B2 | | 4/2006 | Petersen |
| 7,129,670 B2 | | 10/2006 | Oishi et al. |
| 7,439,701 B2 | * | 10/2008 | Torikoshi ................... 318/685 |
| 7,495,409 B2 | * | 2/2009 | Coutu ........................ 318/685 |
| 2002/0185926 A1 | * | 12/2002 | King et al. ................ 310/68 B |
| 2003/0155883 A1 | * | 8/2003 | Wiseman ................... 318/685 |
| 2010/0289444 A1 | * | 11/2010 | Niwa et al. ................ 318/696 |
| 2011/0169442 A1 | * | 7/2011 | Birumachi ................. 318/696 |

* cited by examiner

*Primary Examiner* — Eduardo Colon Santana
(74) *Attorney, Agent, or Firm* — Carmody & Torrance LLP

(57) ABSTRACT

An apparatus for reducing undesired motions during initialization of a stepper motor having a rotor and windings, the apparatus comprising a rotary encoder for sensing direction of rotor rotation; a microcontroller responsive to signals from the rotary encoder for generating bidirectional motor control waveforms having variable digital amplitude values; at least one motor driver for receiving the motor control waveforms and translating the waveforms to drive the motor windings; and wherein the translated waveforms urge the rotor in a first direction and then a second direction to locate a desired rotor position. A method of reducing undesired motions during initialization of a stepper motor having a rotary encoder coupled thereto comprises applying currents to the phase windings to form a magnetic field vector in a direction; sensing a direction of rotor rotation; changing at least one motor phase current to rotate the magnetic field vector in a direction opposite to the direction of first sensed rotor rotation by a first electrical angle; sensing a direction of rotor rotation; changing at least one motor phase current to rotate the magnetic field vector to a next position in a direction opposite to the second sensed rotor rotation by a second electrical angle; and ending initialization, whereby the rotor is aligned with the magnetic field vector in its next position.

17 Claims, 4 Drawing Sheets

APPARATUS AND METHOD FOR MINIMIZING UNDESIRABLE STEPPER MOTOR ROTOR MOTIONS

BACKGROUND OF THE INVENTION

1. Field of the Invention

This invention generally relates to the field of stepper motors and more particularly to an apparatus for and method of, electronic stepper motor control when power is first applied to a stepper motor.

2. Background of the Invention

When power is initially applied to prior art stepper motors and associated drives there is a high probability that its rotor will snap, rather than move smoothly, into a detent position defined by its phase coils and or a magnetic path. The reason is that there are typically 4 natural detent (rest) states for each 360 electrical degrees (4 steps) of motor driver output signal. If the state of a motor driver signal at power up does not match the initial rest state of the rotor, the rotor will snap to the position called for by the state of the motor driver as the motor coils are energized.

This characteristic of prior art stepper motors and associated motor drivers is undesirable because it can lead to noisy clunks upon initial power up and/or initial motor engagement, giving the final machine a less than professional presence; lead to undesirable initial current surges; result in a number of steps before stepper position and motor drive are "in phase" and/or increase the tendency towards oscillations during initial power up state.

SUMMARY AND OBJECTIVES OF THE INVENTION

It is thus an objective of the present invention to overcome the perceived deficiencies in the prior art.

Generally speaking therefore, and in accordance with a first embodiment of the present invention, an apparatus for reducing undesired motions during initialization of a stepper motor having a rotor and windings is provided. In accordance with this first embodiment, the apparatus comprises a rotary encoder for sensing direction of rotor rotation; a microcontroller responsive to signals from the rotary encoder for generating bidirectional motor control waveforms having variable digital amplitude values; at least one motor driver for receiving the motor control waveforms and translating the waveforms to drive the motor windings; and wherein the translated waveforms urge the rotor in a first direction and then a second direction to locate a desired rotor position.

In accordance with another preferred embodiment, a method for reducing undesired motions during initialization of a stepper motor having a rotary encoder coupled thereto is provided. In this preferred embodiment, the stepper motor comprises a rotor and phase windings under control of a microcontroller, and the method comprises applying currents to the phase windings to form a magnetic field vector in a direction; sensing a direction of rotor rotation; changing at least one motor phase current to rotate the magnetic field vector in a direction opposite to the direction of first sensed rotor rotation by a first electrical angle; sensing a direction of rotor rotation; changing at least one motor phase current to rotate the magnetic field vector to a next position in a direction opposite to the second sensed rotor rotation by a second electrical angle; and ending initialization, whereby the rotor is aligned with the magnetic field vector in its next position.

In accordance with yet another preferred embodiment, the method for reducing undesired motions during initialization of a stepper motor having a rotary encoder coupled thereto, said stepper motor having a rotor and phase windings under control of a microcontroller comprises applying currents to the phase windings to form a magnetic field vector in a direction and causing the rotor to rotate in one of a clockwise or counterclockwise direction; changing at least one motor phase current to rotate the magnetic field vector in a direction opposite to the direction of rotor rotation by a first electrical angle and causing the rotor to either (i) rotate in an opposite direction from the first mentioned rotated direction or (ii) continue to rotate in the first mentioned rotated direction; changing at least one motor phase current to rotate the magnetic field vector to a next position in a direction opposite to direction of rotor rotation by a second electrical angle; and ending initialization, whereby the rotor is urged to an initialized position such that it is aligned with the next position of the magnetic field vector.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

BRIEF DESCRIPTION OF THE DRAWINGS

For a fuller understanding of the invention, reference is had to the following description taken in connection with the accompanying figures, in which.

Identical reference numerals in the figures are intended to indicate like features, although not every feature in every figure may be called out with a reference numeral.

DETAILED DESCRIPTION OF THE PREFERRED EMBODIMENTS

Figure 1:
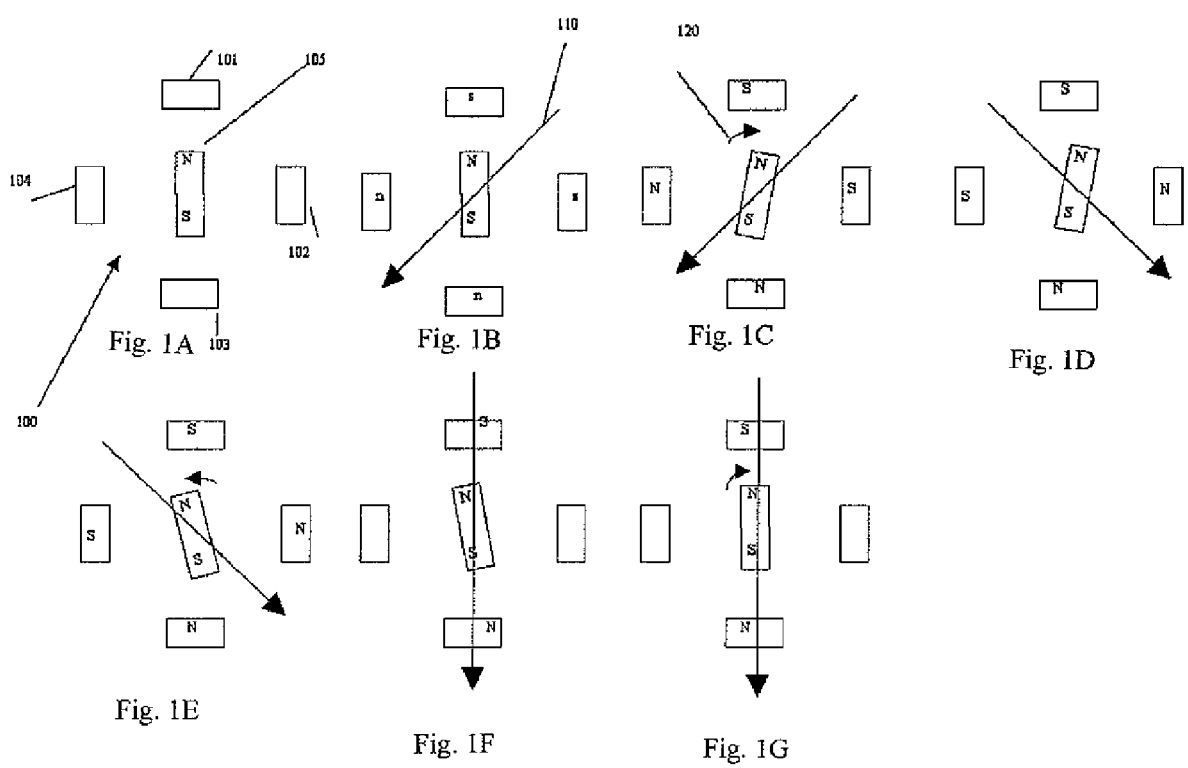
FIGS. 1A through 1G shows an application of the preferred embodiment of the present invention for a first initial condition of a stepper motor.

Generally speaking, in connection with a first preferred embodiment, the present invention is directed to a method and apparatus for reducing or eliminating turn on mechanical transients in a stepper motor resulting from an initial misalignment of an actual rotor position and a commanded rotor position which is based on phase currents of the motor. The present invention avoids problems with the prior art by gradually increasing phase currents while sensing both rotor motion and the direction of rotor motion and using the information to "zero in" on the closest detent that matches a commanded rotor position based on electrical angle of the phase currents.

In the preferred embodiments, the invention preferably comprises a shaft encoder mounted to a stepper motor shaft to sense the amount and direction of motor rotor motion as phase currents are increased. Having sensed motion, the currents are modified to change the direction of a magnetic field vector generated by the phase currents to find a magnetic field vector angle and rotor position that are consistent. When the actual rotor position is consistent with the position commanded by the phase currents, the phase currents are increased to their normal run values and an application program takes control using the found phase currents and rotor position as the application's initial state.

For example, in accordance with a preferred embodiment, an apparatus for reducing undesired motions during initialization of a stepper motor having a rotor and windings comprises a rotary encoder for sensing direction of rotor rotation; a microcontroller responsive to signals from the rotary encoder for generating bidirectional motor control waveforms having variable digital amplitude values; at least one motor driver for receiving the motor control waveforms and translating the waveforms to drive the motor windings; and wherein the translated waveforms urge the rotor in a first direction and then a second direction to locate a desired rotor position.

In a specific preferred embodiment, the motor driver applies currents to the windings to form a magnetic field vector in a direction; the motor driver changes at least one motor phase current to rotate the magnetic field vector in a direction opposite to the direction of a first sensed rotor rotation by a first electrical angle and changes at least one motor phase current to rotate the magnetic field vector to a next position in a direction opposite to a second sensed rotor rotation by a second electrical angle; whereby the rotor is aligned with the magnetic field vector in its next position.

In a first specific embodiment, the first mentioned sensed direction of rotor rotation is in a clockwise direction and the first mentioned rotation of the magnetic field vector is in the counterclockwise direction. As another specific feature, the second mentioned sensed direction of rotor rotation is in a counterclockwise direction and the second mentioned rotation of the magnetic field vector is in the clockwise direction.

In another specific embodiment, the first mentioned sensed direction of rotor rotation is in a counterclockwise direction and the first mentioned rotation of the magnetic field vector is in the clockwise direction. As another specific feature, the second mentioned sensed direction of rotor rotation is in a counterclockwise direction and the second mentioned rotation of the magnetic field vector is in the clockwise direction.

In yet another specific feature, the microcontroller and the at least one motor driver are combined in a single stepper motor controller. Moreover, translating the waveforms may include converting digital amplitude values into analog amplitude values.

In accordance with another preferred embodiment, a method for reducing undesired motions during initialization of a stepper motor having a rotary encoder coupled thereto, said stepper motor having a rotor and phase windings under control of a microcontroller is provided and preferably comprises the steps of applying currents to the phase windings to form a magnetic field vector in a direction; sensing a direction of rotor rotation; changing at least one motor phase current to rotate the magnetic field vector in a direction opposite to the direction of first sensed rotor rotation by a first electrical angle; sensing a direction of rotor rotation; changing at least one motor phase current to rotate the magnetic field vector to a next position in a direction opposite to the second sensed rotor rotation by a second electrical angle; and ending initialization, whereby the rotor is aligned with the magnetic field vector in its next position.

In a specific preferred embodiment, the first electrical angle is at least essentially 90 degrees and the second electrical angle is at least essentially 45 degrees.

Here too, in a preferred embodiment, the first mentioned sensed direction of rotor rotation is in a clockwise direction and the first mentioned rotation of the magnetic field vector is in the counterclockwise direction and the second mentioned sensed direction of rotor rotation is in a counterclockwise direction and the second mentioned rotation of the magnetic field vector is in the clockwise direction. Again, in another preferred embodiment, the first mentioned sensed direction of rotor rotation is in a counterclockwise direction and the first mentioned rotation of the magnetic field vector is in the clockwise direction and the second mentioned sensed direction of rotor rotation is in a counterclockwise direction and the second mentioned rotation of the magnetic field vector is in the clockwise direction.

In accordance with yet another preferred embodiment, the method for reducing undesired motions during initialization of a stepper motor having a rotary encoder coupled thereto, said stepper motor having a rotor and phase windings under control of a microcontroller comprises applying currents to the phase windings to form a magnetic field vector in a direction and causing the rotor to rotate in one of a clockwise or counterclockwise direction; changing at least one motor phase current to rotate the magnetic field vector in a direction opposite to the direction of rotor rotation by a first electrical angle and causing the rotor to either (i) rotate in an opposite direction from the first mentioned rotated direction or (ii) continue to rotate in the first mentioned rotated direction; changing at least one motor phase current to rotate the magnetic field vector to a next position in a direction opposite to direction of rotor rotation by a second electrical angle; and ending initialization, whereby the rotor is urged to an initialized position such that it is aligned with the next position of the magnetic field vector.

Figure 2:
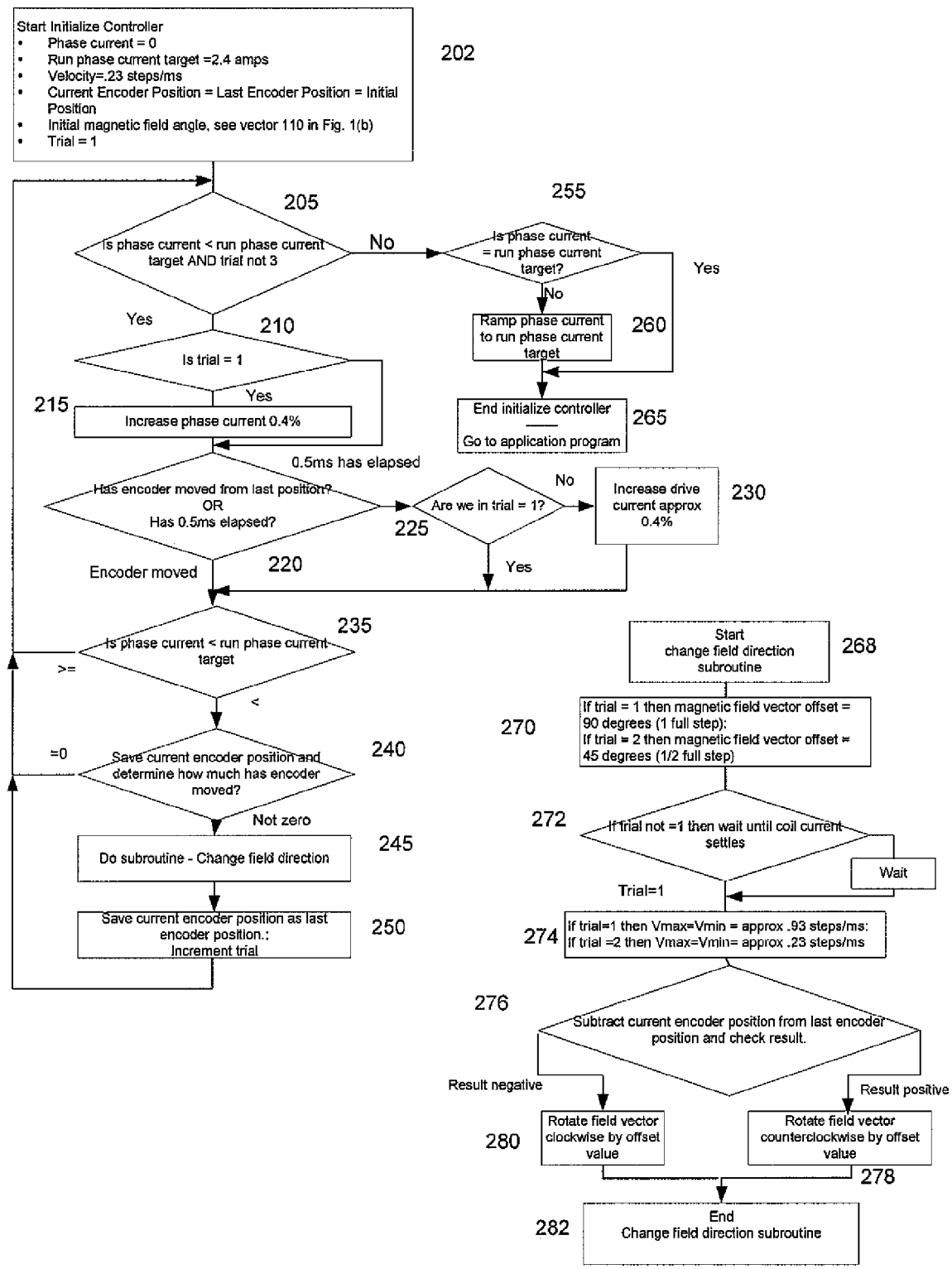
FIG. 2 is a flow chart illustrating a preferred program flow of the present invention.

A best method for carrying out the invention is described with the aid of simplified motor model 100 shown in FIGS. 1a though 1g and the flow chart of FIG. 2. FIGS. 3a through 3g are used to show a different initial state than shown in FIGS. 1a though 1g. Motor 100 is a 4 pole permanent magnet stepper motor. Motor 100 includes poles 101-104 and permanent magnet rotor 105 having a north and south pole as indicated. Power has not been applied to any portion of the motor 100 in FIG. 1a.

The flow chart of FIG. 2 starts at block 202 where, among other actions, the phase currents are initialized at 0.4% of rated run current and applied so that the poles have the polarities shown in FIG. 1b and yield a net magnetic field in the direction shown by vector 110.

In the preferred embodiment of the invention, after initialization of block 202 the embedded software in microcontroller 405 sequentially performs the tasks described in blocks 205, 210, 215, 220, 235 and 240 then back to block 205 of the flow chart in FIG. 2. The initial program processes in the flow chart of FIG. 2 is dependent upon whether the process has timed out or motion is detected due to phase currents having increased to a level to cause motion of rotor 110 (shown by arrow 120) due to the net urging magnetic field at line 110 of FIGS. 1b and 1c.

In a preferred embodiment phase currents are increased at about 0.4% per pass through block 215 through block 240 at a rate of approximately 0.8% to 2% per ms.

When the rotor moves and the phase currents are still less than run currents, the current encoder position and encoder movement are saved at block 240 after which control passes to a subroutine at block 268. At first entry into subroutine 268 trial parameter is equal to 1 so that, as described in block 270, the next pass through blocks 205, 210, 215, 220, 235 and 240 will be with magnetic field vector 110 offset from its initial value (as indicated by vector 110 in FIG. 1b) by 1 step or 90 degrees. We note that if the trial parameter is 2 then the next field angle change is set to ½ step or 45 degrees. The offset direction is established based on the direction of rotor 105 rotation as determined at block 276. It has been discovered that it is advantageous to include blocks 272 and 274 in the subroutine starting at block 268 to accommodate delays due to coil time constants and effects due to the inertia of rotor 105 respectively.

For the conditions of FIG. 1b, magnetic field vector 110 causes rotation of rotor 110 to start rotating in the clockwise direction shown by arrow 120. At the end of the subroutine (block 282) magnetic field vector 110 is moved 90 degrees counterclockwise and is at the position shown in FIGS. 1d and 1e.

The process described in the flow chart in FIG. 2 then proceeds to block 250 where the trial number is increased to 2 and the process proceeds back to decision block 205. The basic loop of 205, 210, 215, 220, 235 and 240 repeats again until as shown in FIG. 1e, the position of vector 110 causes counterclockwise rotation of rotor 105. Here again the flow then passes to the subroutine at 268 where a new angle change of ½ step (45 degrees) is established and then activated in a clockwise direction (rotor 105 moved counterclockwise) after passing through blocks 276 and 278. Vector 110 is now located as shown in FIGS. 1f and 1g which urges rotor 105 into its final position shown in 1g. Program flow returns from subroutine 268 to block 250 where trial is incremented to 3 and program flow proceeds back to block 205 and exits through block 265.

We now explore the logical flow of the invention with the initial conditions shown in FIG. 3 wherein the north and south poles of rotor 105 have been reversed from the position shown in FIG. 1a.

Figures 3A, 3B, 3C, 3D:
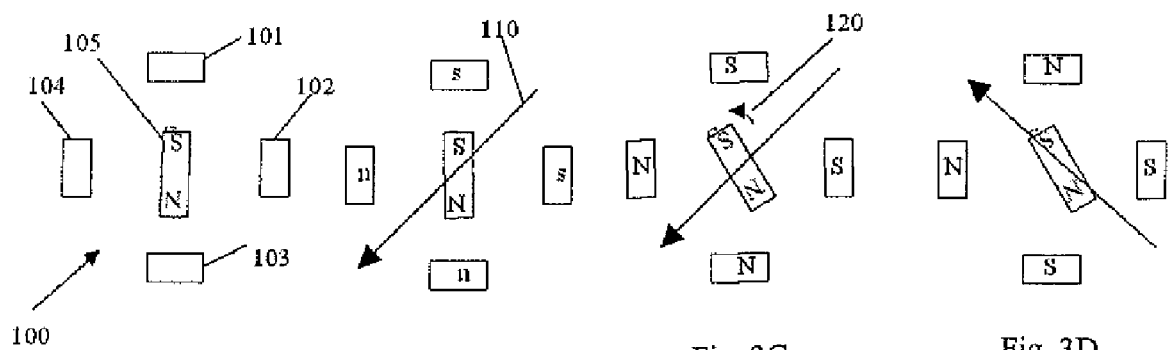
FIGS. 3A through 3G shows an application of the preferred embodiment of the present invention for a second initial condition of a stepper motor.
Figures 3E, 3F, 3G:
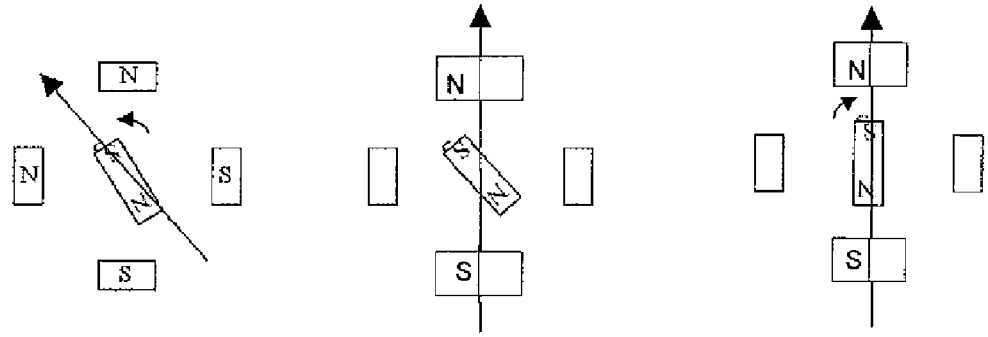

Since the initial conditions of the flow chart in FIG. 3 are unchanged for this application of the invention, the magnetic vector 110 again points in the direction shown in FIG. 3a. However for this condition (as shown FIG. 3b), vector 110 urges rotor 105 to start rotation in a counterclockwise direction with the resulting motion is sensed by rotary encoder 430 of FIG. 4. Since rotor 105 movement in FIG. 3c is counterclockwise, the magnetic field indicated by vector 110 is therefore moved clockwise by 1 full step or 90 degrees as shown in FIGS. 3d and 3e and trial is increased by 1 to 2.

In this trial 2, block 210 causes phase currents to hold at their value from trial 1 while rotor 105 continues to rotate in a counterclockwise direction trying to align with vector 110 in FIG. 3(e). Block 240 then senses that rotor 105 is still moving so that processing continues in the subroutine starting at block 268 where vector 110 is advanced clockwise by ½ step or 45 degrees into position shown in FIG. 3f. With vector 110 in the position shown in FIG. 3f rotor 105 is urged in a clockwise direction coming into a position that is consistent with vector 110.

Figure 4:
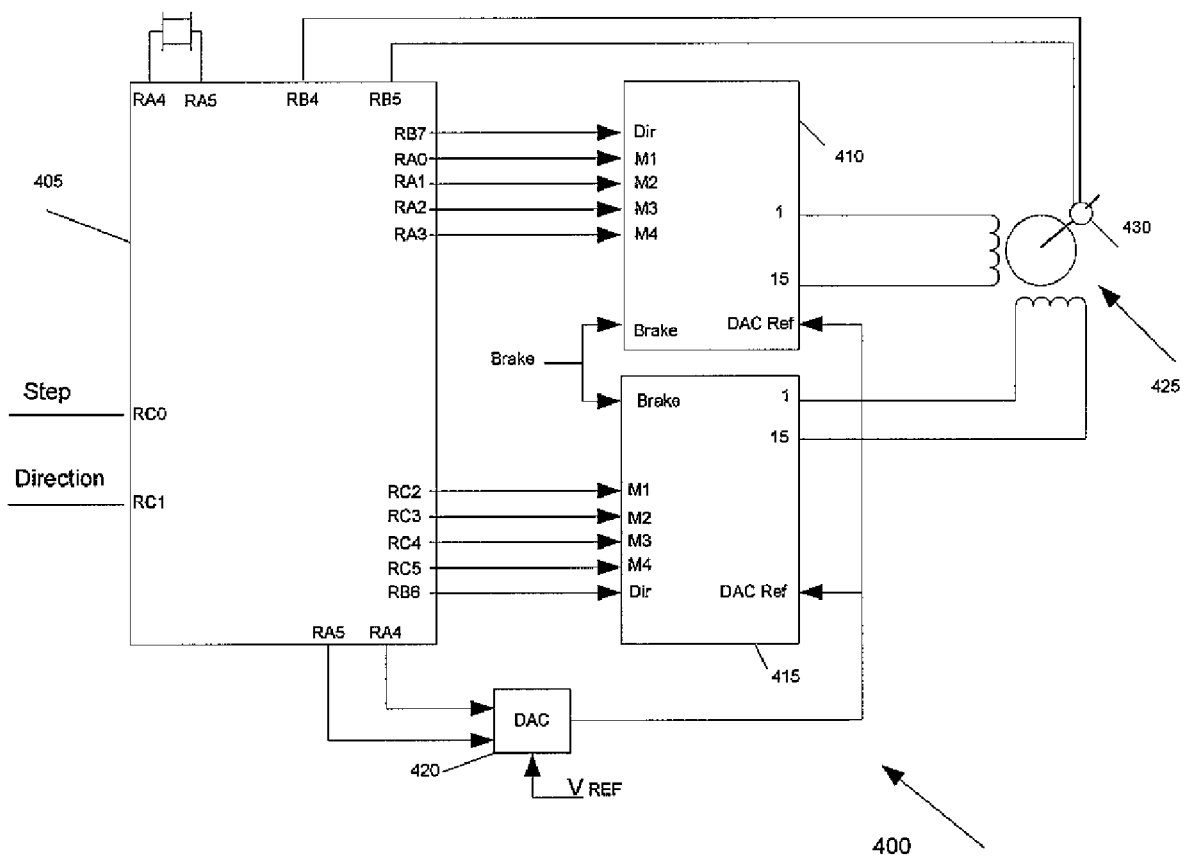
FIG. 4 is a block diagram of a preferred embodiment of the apparatus in accordance with the present invention.

In accordance with a preferred embodiment of the present invention, the apparatus is disclosed below with the aid of FIG. 4. As shown in FIG. 4, microcontroller 405 receives step and direction commands from an over-all application while drivers 410 and 415 may receive a brake command from the application program. Microcontroller 405 is preferably a Microchip 16F685 and contains all code necessary to interface with the application program and to implement the flow chart of FIG. 2. Drivers 410 and 415 are preferably LMD 18245T and translate the desired coil currents from their digital format at the output of microcontroller 405 to analog values required by the phase windings of motor 405. In a preferred embodiment motion control is configured for 16 level microstepping using M1-M4 inputs of each of drivers 410 and 415. DAC 420 advantageously provides the additional resolution needed to achieve the preferred current increments of 0.4% of running current. DAC 420 is activated during the initialization stage of block 202 and deactivated (no pre-scaling) after program flow passes through block 265 and control passes to the application program that directs microcontroller 405 and hence stepper motor 425.

In an alternate embodiment, a System Semiconductor Motion Controller M3001 is used to integrate the functionality of microcontroller 405, DAC 420 and drivers 410 and 415 while providing addition control flexibility.

While the invention has been particularly shown and described with respect to preferred embodiments thereof, it will be understood by those skilled in the art that changes in form and details may be made therein without departing from the scope and spirit of the invention. For example, while motor 100 is described and or diagrammatically shown as a 2 phase motor, 4 pole permanent magnet stepper motor, the motor may also be a multiple phase reluctance type motor with multiple poles or a hybrid type motor combining the features of a reluctance motor and permanent magnet motor combining the features of both types. Likewise, the distribution of components as set forth above is exemplary and should not be considered limiting.

What is claimed is:

1. An apparatus for reducing undesired motions during initialization of a stepper motor having a rotor and windings, said apparatus comprising:
    a rotary encoder for sensing direction of rotor rotation;
    a microcontroller responsive to signals from the rotary encoder for generating bidirectional motor control waveforms having variable digital amplitude values;
    at least one motor driver for receiving the motor control waveforms and translating the waveforms, applying incremental step currents to the windings to form a magnetic field vector in a direction, to drive the motor windings; and
    wherein the translated waveforms urge the rotor in a first direction and then a second direction to locate a desired rotor position and reduce the undesired motions during initialization.

2. The apparatus as claimed in claim 1, wherein:
    the motor driver changes at least one motor phase current to rotate the magnetic field vector in a direction opposite to the direction of a first sensed rotor rotation by a first electrical angle and changes at least one motor phase current to rotate the magnetic field vector to a next position in a direction opposite to a second sensed rotor rotation by a second electrical angle;
    whereby the rotor is aligned with the magnetic field vector in its next position.

3. The apparatus as claimed in claim 1, wherein the first mentioned sensed direction of rotor rotation is in a clockwise direction and the first mentioned rotation of the magnetic field vector is in the counterclockwise direction.

4. The apparatus as claimed in claim 3, wherein the second mentioned sensed direction of rotor rotation is in a counterclockwise direction and the second mentioned rotation of the magnetic field vector is in the clockwise direction.

5. The apparatus as claimed in claim 1, wherein the first mentioned sensed direction of rotor rotation is in a counterclockwise direction and the first mentioned rotation of the magnetic field vector is in the clockwise direction.

6. The apparatus as claimed in claim 5, wherein the second mentioned sensed direction of rotor rotation is in a counterclockwise direction and the second mentioned rotation of the magnetic field vector is in the clockwise direction.

7. The apparatus as claimed in claim 1, wherein the microcontroller and the at least one motor driver are combined in a single stepper motor controller.

8. The apparatus as claimed in claim 1, wherein translating the waveforms includes converting digital amplitude values into analog amplitude values.

9. A method for reducing undesired motions during initialization of a stepper motor having a rotary encoder coupled thereto, said stepper motor having a rotor and phase windings under control of a microcontroller, said method comprising:
- applying incremental step currents to the phase windings to form a magnetic field vector in a direction;
- at each incremental step, sensing if a rotor rotation occurs in a first direction;
- if a rotation occurs, changing at least one motor phase current to rotate the magnetic field vector in a direction opposite to the direction of first sensed rotor rotation by a first electrical angle;
- sensing if a rotor rotation occurs in a second direction;
- changing at least one motor phase current to rotate the magnetic field vector to a next position in a direction opposite to the second sensed rotor rotation by a second electrical angle; and
- ending initialization, whereby the rotor is aligned with the magnetic field vector in its next position.

10. The method as claimed in claim 9, wherein the first electrical angle is at least essentially 90 degrees.

11. The method as claimed in claim 10, wherein the second electrical angle is at least essentially 45 degrees.

12. The method as claimed in claim 9, wherein the first mentioned sensed direction of rotor rotation is in a clockwise direction and the first mentioned rotation of the magnetic field vector is in the counterclockwise direction.

13. The method as claimed in claim 12, wherein the second mentioned sensed direction of rotor rotation is in a counterclockwise direction and the second mentioned rotation of the magnetic field vector is in the clockwise direction.

14. The method as claimed in claim 9, wherein the first mentioned sensed direction of rotor rotation is in a counterclockwise direction and the first mentioned rotation of the magnetic field vector is in the clockwise direction.

15. The method as claimed in claim 14, wherein the second mentioned sensed direction of rotor rotation is in a counterclockwise direction and the second mentioned rotation of the magnetic field vector is in the clockwise direction.

16. An apparatus for carrying out the method as claimed in claim 10.

17. A method for reducing undesired motions during initialization of a stepper motor having a rotary encoder coupled thereto, said stepper motor having a rotor and phase windings under control of a microcontroller, said method comprising:
- applying incremental step currents to the phase windings to form a magnetic field vector in a direction until the rotor rotates in one of a clockwise or counterclockwise direction;
- after rotation has occurred, changing at least one motor phase current to rotate the magnetic field vector in a direction opposite to the direction of rotor rotation by a first electrical angle and causing the rotor to either (i) rotate in an opposite direction from the first mentioned rotated direction or (ii) continue to rotate in the first mentioned rotated direction;
- changing at least one motor phase current to rotate the magnetic field vector to a next position in a direction opposite to direction of rotor rotation by a second electrical angle; and
- ending initialization, whereby the rotor is urged to an initialized position such that it is aligned with the next position of the magnetic field vector.

* * * * *